US006799108B2

(12) United States Patent
Aldrich, III et al.

(10) Patent No.: US 6,799,108 B2
(45) Date of Patent: Sep. 28, 2004

(54) CONTROL SYSTEM AND METHOD FOR MAINTAINING A CONSTANT ENGINE IDLE SPEED OF AN AUTOMATIC TRANSMISSION-EQUIPPED VEHICLE

(75) Inventors: William Leonard Aldrich, III, Davisburg, MI (US); Glenn P. O'Connell, Troy, MI (US); Klaus J. Stutzer, Wiesbaden (DE); Michael Lee Velliky, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 8 days.

(21) Appl. No.: 10/118,282

(22) Filed: Apr. 8, 2002

(65) Prior Publication Data

US 2003/0191571 A1 Oct. 9, 2003

(51) Int. Cl.[7] .................................................. G06F 17/00

(52) U.S. Cl. ............................ 701/51; 701/54; 701/66; 477/181; 477/116; 192/3.51

(58) Field of Search ............................ 701/51, 54, 66, 701/67; 477/166, 168, 180, 181, 116, 117; 192/3.51

(56) References Cited

U.S. PATENT DOCUMENTS 4,823,266 A * 4/1989 Baltusis et al. ............ 701/110
4,943,920 A * 7/1990 Hiramatsu et al. ............ 701/51
5,046,178 A * 9/1991 Hibner et al. ................ 701/60
5,054,450 A * 10/1991 Oota et al. .................. 123/478
5,199,326 A * 4/1993 Iwatsuki et al. ............. 477/98
5,207,122 A * 5/1993 Minagawa .................. 475/123
5,307,711 A * 5/1994 Kimura et al. .............. 477/109
5,307,727 A * 5/1994 Berger et al. ................ 91/29
5,836,851 A * 11/1998 Ruman ...................... 477/107
5,855,533 A * 1/1999 Tolkacz et al. ............. 477/110
6,106,432 A * 8/2000 Nishida ..................... 477/116
6,115,661 A * 9/2000 Hosseini et al. ............. 701/51
6,202,015 B1 * 3/2001 Iizuka ........................ 701/51

* cited by examiner

*Primary Examiner*—Jacques H. Louis-Jacques
*Assistant Examiner*—Eric M. Gibson
(74) *Attorney, Agent, or Firm*—Christopher DeVries

(57) ABSTRACT

A control system and method maintains a constant engine idle speed during a garage shift of an automatic transmission-equipped vehicle with a torque converter. An engine control module or other processor identifies when transmission input clutch fill occurs. The engine control module increases engine output based on the transmission input clutch fill and before a decrease in engine idle speed occurs. The engine control module latches a turbine speed and a speed ratio (turbine speed/engine speed). The engine control module declares transmission input clutch fill if the latched turbine speed minus a current turbine speed is greater than the first calibration constant or if the latched speed ratio minus a current speed ratio is greater than the second calibration constant. The engine control module increases the engine output after waiting a first time delay after the transmission clutch fill.

26 Claims, 4 Drawing Sheets

CONTROL SYSTEM AND METHOD FOR MAINTAINING A CONSTANT ENGINE IDLE SPEED OF AN AUTOMATIC TRANSMISSION-EQUIPPED VEHICLE

TECHNICAL FIELD

The present invention relates to automatic transmissions for vehicles, and more particularly to control systems for adjusting engine idle speed in a vehicle including an automatic transmission with a torque converter.

BACKGROUND OF THE INVENTION

Vehicles such as automobiles, trucks, etc., typically include an internal combustion engine that is coupled by a hydraulic torque converter to an automatic transmission. The hydraulic torque converter includes a housing, a turbine, a stator and a pump. The housing is bolted to the flywheel of the engine. The housing rotates at the same speed as the engine. The pump includes fins that are attached to the housing. The fluid is directed by the fins radially outwardly into fins on the turbine, which causes the turbine to spin. The turbine is connected to the transmission. As a result, the hydraulic torque converter transfers engine torque to the transmission.

An engine control module (ECM) controls the internal combustion engine and modifies engine idle speed. The ECM modifies engine idle speed using idle air control (IAC), electronic throttle control (ETC), or other similar functions. The ECM typically receives the following control inputs: engine speed, transmission input speed, transmission temperature, transmission gear selector position, and vehicle speed. The transmission input speed is equal to a turbine speed of the torque converter.

Automatic transmissions typically include a gear selector for selecting non-drive transmission positions such as park or neutral and drive transmission positions such as reverse or forward. A garage shift occurs when the driver shifts the automatic transmission from a non-drive transmission position to a drive transmission position. When the garage shift occurs, the load on the engine increases significantly when the transmission has the ability to transmit torque from the engine to the drive wheels. The torque increase does not occur instantaneously. Rather, there is a time delay while the transmission engages a transmission input clutch. The time delay is a function of the transmission type, pump pressure, oil temperature and other factors. Additionally, the initial load presented by the transmission is usually greater than the steady-state load. In other words, more effort is required to initially shear and spin the transmission fluid in the transmission than to keep the transmission spinning. During the garage shift, the magnitude of the transmission load and its timing vary greatly. As a result of this variation, maintaining constant engine idle speed during the garage shift can be challenging for the ECM.

Referring now to FIG. 1, a poorly compensated garage shift is illustrated. Engine idle speed 10, transmission input speed 12, and engine idle speed compensation 14 as well as their respective timings are shown. The start of the garage shift occurs at 20 and ends at 22. A time delay indicated by arrow 26 occurs while the transmission is applying the transmission input clutch. As can be appreciated, the load of the transmission on the engine increases quickly as seen at 30 causing the engine speed to sag as can be seen at 32.

Conventional methods of compensating engine idle speed during the garage shift usually include closed-loop feedback systems that detect engine sag and subsequently increase engine idle speed. Other methods inhibit closed-loop idle control until the transmission load is present or use a fixed timing to anticipate the increased load requirement. Closed-loop systems require an engine speed sag to occur. Fixed timing is susceptible to transmission clutch engagement variations and may cause engine speed sag or flares.

SUMMARY OF THE INVENTION

A control system and method according to the present invention maintains a constant engine idle speed during a garage shift of an automatic transmission with a torque converter. An engine control module or other processor identifies when transmission input clutch fill occurs. The engine control module increases engine output based on when the transmission input clutch fill occurs and before a decrease in engine idle speed occurs.

In other features of the invention, memory that is associated with the engine control module latches turbine speed and speed ratio. The engine control module declares transmission input clutch fill if the latched turbine speed minus a current turbine speed is greater than a first calibration constant. The engine control module also declares transmission input clutch fill if the latched speed ratio minus a current speed ratio is greater than a second calibration constant.

In still other features, the engine control module increases the engine output after waiting a first time delay after the transmission clutch fill occurs. The engine control module adds steady-state and dynamic engine output boosts. The dynamic engine output boost compensates for initial shear load within the transmission. The engine control module reduces the dynamic boost over time at a first rate. The dynamic and the steady-state engine output boosts are related to transmission temperature. The steady-state engine output boost compensates for steady-state load of the automatic transmission.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT

The following description of the preferred embodiment(s) is merely exemplary in nature and is in no way intended to limit the invention, its application, or uses.

The present invention detects transmission input clutch fill and performs engine idle speed compensation to provide a constant engine idle during the garage shift. In contrast to closed-loop feedback systems that compensate after engine idle speed decreases, the present invention anticipates a reduction in the engine idle speed before it occurs and provides compensation. As a result, engine idle quality is dramatically improved. While the transmission clutch fill detection and engine idle compensation will be described in conjunction with the engine control module (ECM), the present invention can be performed by one or more other vehicle processors.

Figure 1:
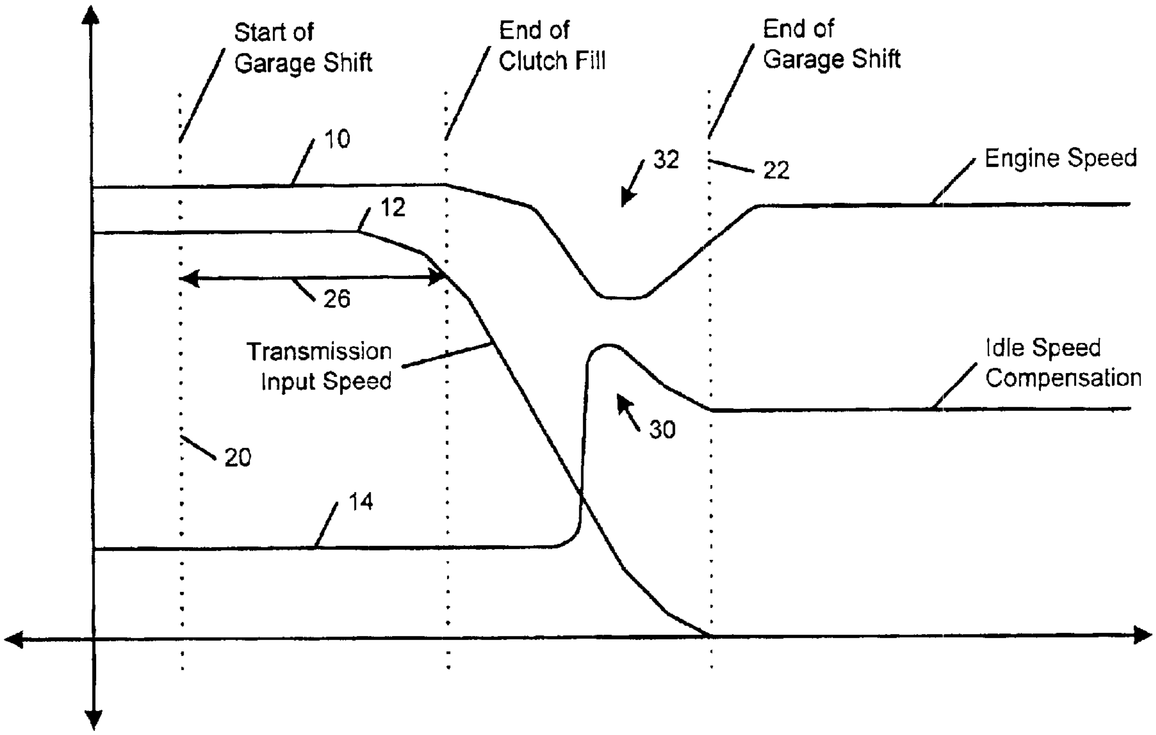
FIG. 1 Prior Art
FIG. 1 illustrates an uncompensated garage shift according to the prior art.
Figure 2:
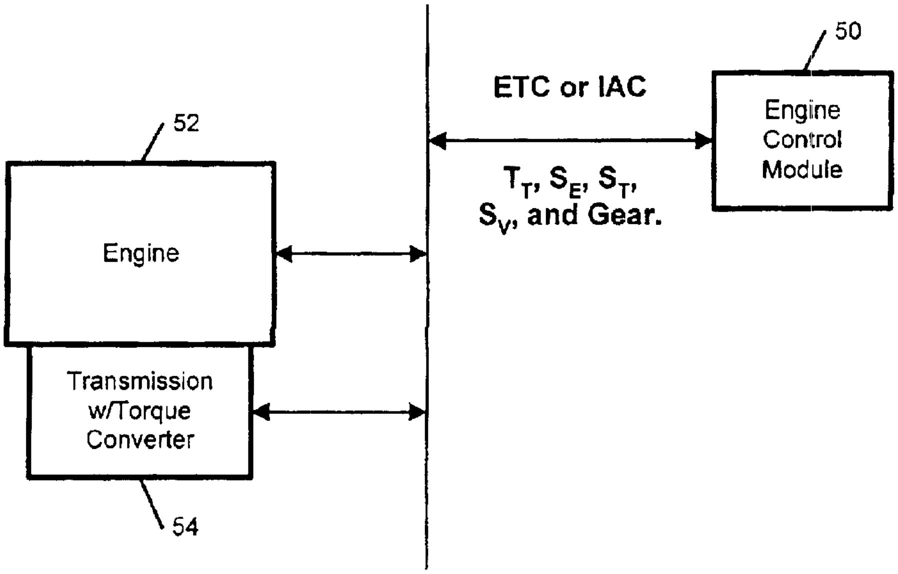
FIG. 2 is a functional block diagram of an engine control module (ECM) according to the present invention for compensating garage shifts to provide a constant engine idle speed.

Referring now to FIG. 2, an engine control module 50 is linked to an engine 52 and a transmission 54 with a torque converter. The engine control module 50 receives the following inputs from the engine 52 and the transmission 54: engine speed $S_E$, transmission input speed $S_T$, transmission temperature $T_T$, transmission gear selector position GEAR, and vehicle speed $S_V$.

The engine control module 50 according to the present invention has been designed to accommodate the load variability and timing variability that occur during garage shifts. The engine control module anticipates the load increase and the corresponding engine speed disturbance. The engine control module 50 applies compensation before engine idle speed falls out of regulation. In closed-loop feedback systems, the engine idle speed falls out of regulation before compensation is performed, which reduces engine idle quality.

A first method (shown in FIG. 4) identifies when the transmission has the ability to transmit engine torque after the gear selector position changes from neutral to drive. In other words, the first method identifies transmission input clutch fill. The timing of the transmission input clutch fill is important because it represents the precise time when the engine load increase begins. If the engine output is increased prior to this time, an engine speed flare will result. Conversely if the engine output is increased significantly after this point, engine speed sag will occur. By precisely detecting the transmission input clutch fill, the increase in the output of the engine can be applied so that neither an engine speed flare nor an engine speed sag occurs.

Detection of transmission input clutch fill is accomplished by latching the turbine speed and the speed ratio (turbine speed/engine speed) at the beginning of the garage shift. Then, the current turbine speed and the speed ratio are compared at a periodic rate to the measurements that are latched at the beginning of the garage shift. If the latched turbine speed minus a current turbine speed is greater than a calibration value K3 or the latched speed ratio minus a current speed ratio is greater than a calibration value K2, then transmission input clutch fill has occurred. Speed ratio and turbine speed are both used for transmission clutch fill detection because under some conditions, the speed ratio does not change significantly as the transmission load is applied. However, the turbine speed will decrease towards zero and will trigger the detection of transmission input clutch fill. Under most conditions, however, the speed ratio is a more sensitive and desirable indicator.

Figure 3:
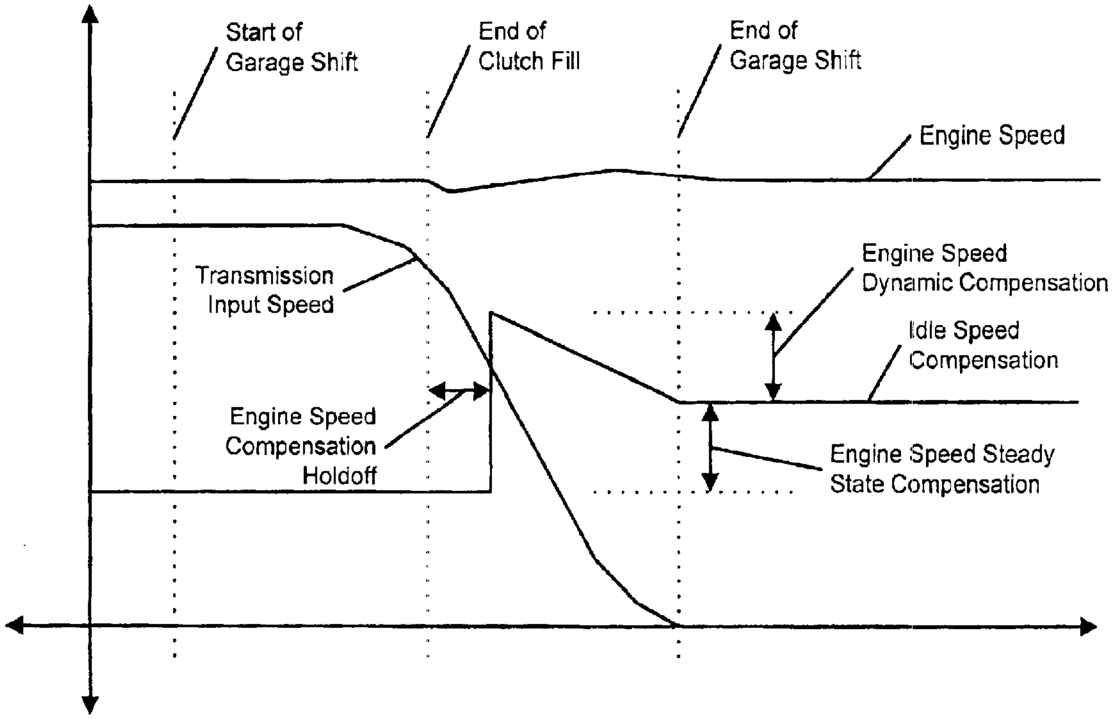
FIG. 3 illustrates a compensated garage shift according to the present invention that is provided by the engine control module of FIG. 2.

The second method (shown in FIG. 5) acts on the detection of transmission input clutch fill and determines the appropriate engine speed compensation to prevent engine sag or engine flare. The compensation is added after a time delay K6 has elapsed. There are two engine idle compensation components that are added together: a steady-state boost K4 and a dynamic boost K5. The steady-state boost K4 compensates for the additional steady-state load due to the transmission. The dynamic boost K5 compensates for the initial shear (static) load of the transmission and is decreased over time at a rate K7 (as can be seen in FIG. 3). The magnitude of the boost terms K4 and K5 are a function of or related to the transmission temperature $T_T$. Typically, the colder the transmission, the larger the magnitude of the idle speed compensation that is required.

Figure 4:
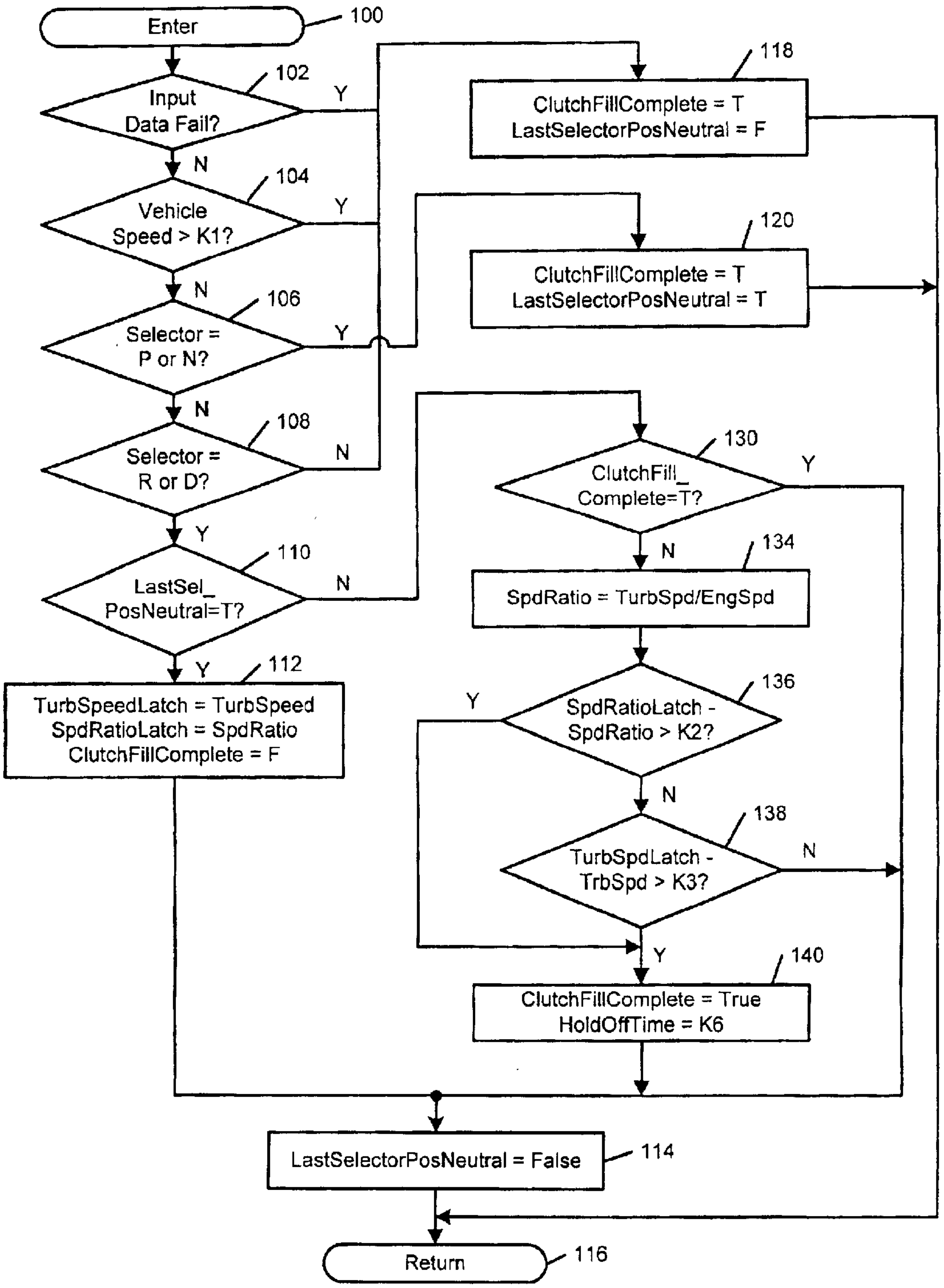
FIG. 4 is a flow chart illustrating steps for detecting transmission input clutch fill that is performed by the engine control module of FIG. 2.
Figure 5:
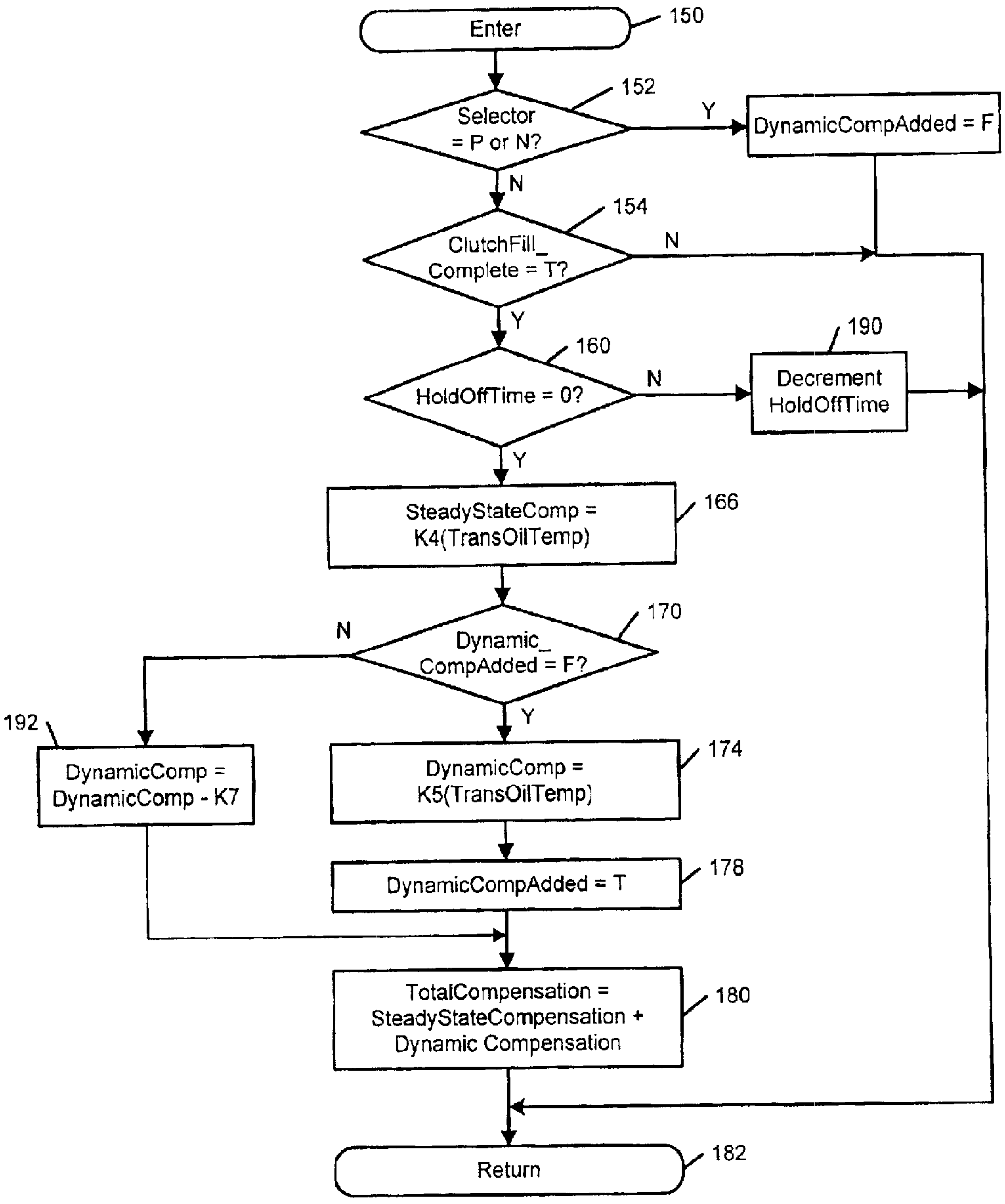
FIG. 5 is a flow chart illustrating steps for compensating engine idle speed based on the detected transmission input clutch fill that is performed by the engine control module of FIG. 2.

Referring now to FIGS. 3, 4, and 5, the engine control module 50 according to the present invention detects transmission input clutch fill and performs engine idle speed compensation to provide a constant engine idle during a garage shift. The steps illustrated in FIG. 4 are performed by the engine control module 50 to detect transmission input clutch fill.

The steps for detecting the transmission input clutch fill begin with step 100. In step 102, the engine control module 50 determines whether the input data fails. If not, the engine control module 50 determines whether the vehicle speed Sv is greater than a first calibration value K1 in step 104. If not, the engine control module 50 determines whether the gear selector is in park or neutral in step 106. If not, the engine control module determines whether the gear selector is in reverse or drive in step 108. If not, the engine control module 50 determines whether the last gear selector position was park or neutral in step 110.

If step 110 was true, the engine module sets the latched turbine speed equal to the turbine speed, the latched speed ratio equal to the speed ratio, and the clutch fill complete flag is set equal to false. Control continues from step 112 to step 114 where the last gear selector position neutral flag is set equal to false. Control ends with step 116. If steps 102 or 104 are true or step 108 is false, the engine control module continues with step 118 where the clutch fill complete flag is set equal to true and the last gear selector position neutral flag is set equal to false. Control continues from step 118 to step 116.

If step 106 is true, the engine control module 50 continues with step 120 where the clutch fill complete flag is set equal to true and the last gear selector position neutral flag is set equal to true. Control continues from step 120 to step 116. If step 110 is false, the engine control module 50 determines whether the clutch fill complete flag is set equal to true in step 130. If not, the engine control module 50 sets the speed ratio equal to the turbine speed divided by the engine speed. In step 136, the engine control module 50 determines whether the latched speed ratio minus a current speed ratio is greater than a calibration constant K2. If not, the engine control module 50 determines whether the latched turbine speed minus a current turbine speed is greater than a third calibration constant K3 in step 138. If not, control continues with step 114. If steps 136 or 138 are true, control continues with step 140 where the clutch fill complete flag is set equal to true and the hold off time is set equal to a sixth calibration value K6.

As previously described above, the steps that are illustrated in FIG. 4 and described above determine when the transmission clutch fill is complete. The method illustrated in FIG. 5 provides engine idle speed compensation. Control begins with step 150. In step 152, the engine control module 50 determines whether the gear selector is in park or neutral.

If not, the engine control module 50 determines whether the clutch fill complete flag is set equal to true. If it is, the engine control module 50 determines whether the hold off time K6 is equal to zero in step 160. If it is, the engine control module 50 continues with step 166 where the steady-state compensation is set equal to a first calibration function K4 that is related to the transmission oil temperature. Control continues with step 170 where the engine control module 50 determines whether the dynamic compensation added flag is false. If it is, the engine control module sets the dynamic compensation equal to a second calibration function K5 that is related to the transmission oil temperature in step 174. Control continues with step 178 where the dynamic compensation flag added is set equal to true. In step 180, the engine control module 50 sets the total compensation equal to the steady-state compensation plus the dynamic compensation. Control ends with step 182.

If step 152 is true, the dynamic compensation added flag is set equal to false and control continues with step 182. If step 154 is false, control continues with step 182. If step 160 is false, control continues with step 190 where the hold off time is decremented. Control continues from step 190 to step 182. If step 170 is false, control continues with step 192 where dynamic compensation is set equal to the dynamic compensation minus a calibration value K7. Control continues from step 192 to step 180.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for maintaining a constant engine idle speed during a garage shift of an automatic transmission with a torque converter, comprising:

identifying when transmission input clutch fill occurs;

before a decrease in engine idle speed occurs, increasing engine output based on when said transmission input clutch fill occurs to compensate for increased engine load and to maintain engine idle speed regulation;

determining a steady-state engine compensation output boost; and determining a dynamic engine compensation output boost to vary the engine output.

2. The method of claim 1 further comprising latching a turbine speed in memory.

3. The method of claim 2 further comprising comparing said latched turbine speed minus a current turbine speed to a first calibration constant.

4. The method of claim 3 further comprising declaring transmission input clutch fill if said latched turbine speed minus said current turbine speed is greater than said first calibration constant.

5. The method of claim 1 further comprising latching a speed ratio in memory, wherein said speed ratio is equal to a turbine speed divided by engine speed.

6. The method of claim 5 further comprising comparing said latched speed ratio minus a current speed ratio to a second calibration constant.

7. The method of claim 6 further comprising declaring transmission input clutch fill if said latched speed ratio minus said current speed ratio is greater than said second calibration constant.

8. The method of claim 1 further comprising increasing said engine output after waiting a first time delay after said transmission clutch fill occurs.

9. The method of claim 1 further comprising adding said steady-state and dynamic engine compensation output boosts.

10. The method of claim 1 wherein said dynamic engine output compensation boost compensates for initial shear.

11. The method of claim 10 further comprising reducing said dynamic compensation boost over time at a first rate.

12. The method of claim 1 wherein the magnitude of said dynamic engine compensation output boost and said steady-state engine compensation output boost is related to transmission temperature.

13. The method of claim 1 wherein said dynamic engine compensation output boost compensates for a steady-state load of said automatic transmission.

14. A control system for maintaining a constant engine idle speed during a garage shift of an automatic transmission with a torque converter, comprising:

an engine control module that identifies when transmission input clutch fill occurs and that increases engine output based on when said transmission input clutch fill occurs to compensate for increased engine load and to maintain engine idle speed regulation; and wherein said engine control module determines a steady-state engine compensation output boost and a dynamic engine compensation output boost.

15. The control system of claim 14 further comprising memory connected to said engine control module that latches a turbine speed.

16. The control system of claim 15 wherein said engine control module compares said latched turbine speed minus a current turbine speed to a first calibration constant.

17. The control system of claim 16 wherein said engine control module declares transmission input clutch fill if said latched turbine speed minus said current turbine speed is greater than said first calibration constant.

18. The control system of claim 15 wherein said memory latches a speed ratio, wherein said speed ratio is equal to turbine speed divided by engine speed.

19. The control system of claim 18 wherein said engine control module compares said latched speed ratio minus a current speed ratio to a second calibration constant.

20. The control system of claim 19 wherein said engine control module declares transmission input clutch fill if said latched speed ratio minus said current speed ratio is greater than said second calibration constant.

21. The control system of claim 14 wherein said engine control module increases said engine output after waiting a first time delay after said transmission clutch fill is declared.

22. The control system of claim 14 wherein said engine control module adds said steady-state and dynamic engine compensation output boosts.

23. The control system of claim 14 wherein said dynamic engine output compensation boost compensates for initial shear.

24. The control system of claim 23 further comprising reducing said dynamic compensation boost over time at a first rate.

25. The control system of claim 14 wherein the magnitude of said dynamic engine compensation output boost and said steady-State engine output compensation boost is related to transmission temperature.

26. The control system of claim 14 wherein said steady-state engine compensation output boost compensates for a steady-state load of said automatic transmission.

* * * * *